May 7, 1946.  B. THOMSON  2,399,956
ELECTRIC REMOTE CONTROL SYSTEM
Filed Sept. 5, 1942  6 Sheets-Sheet 1
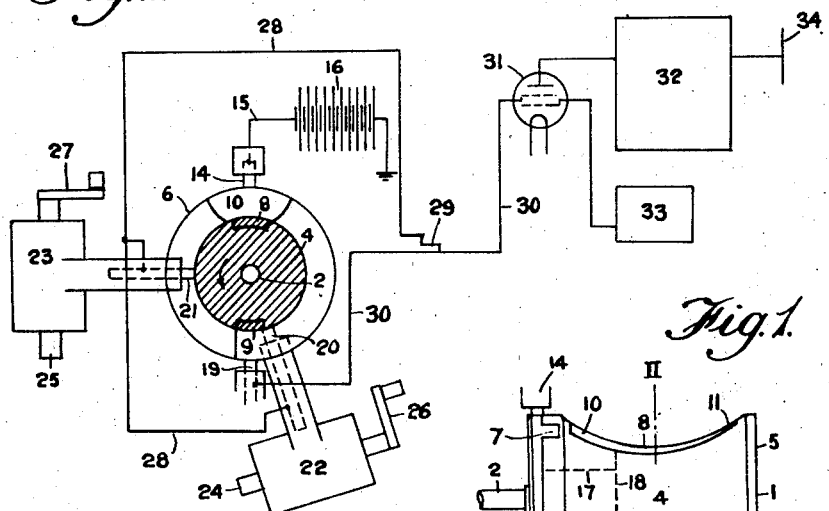
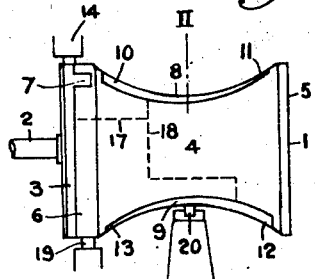
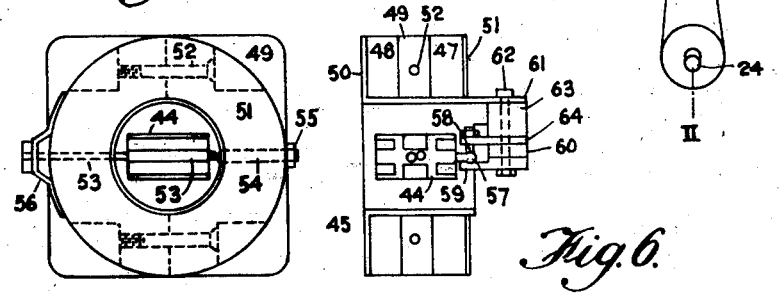
Inventor
Bernard Thomson
By [signature]
Atty.

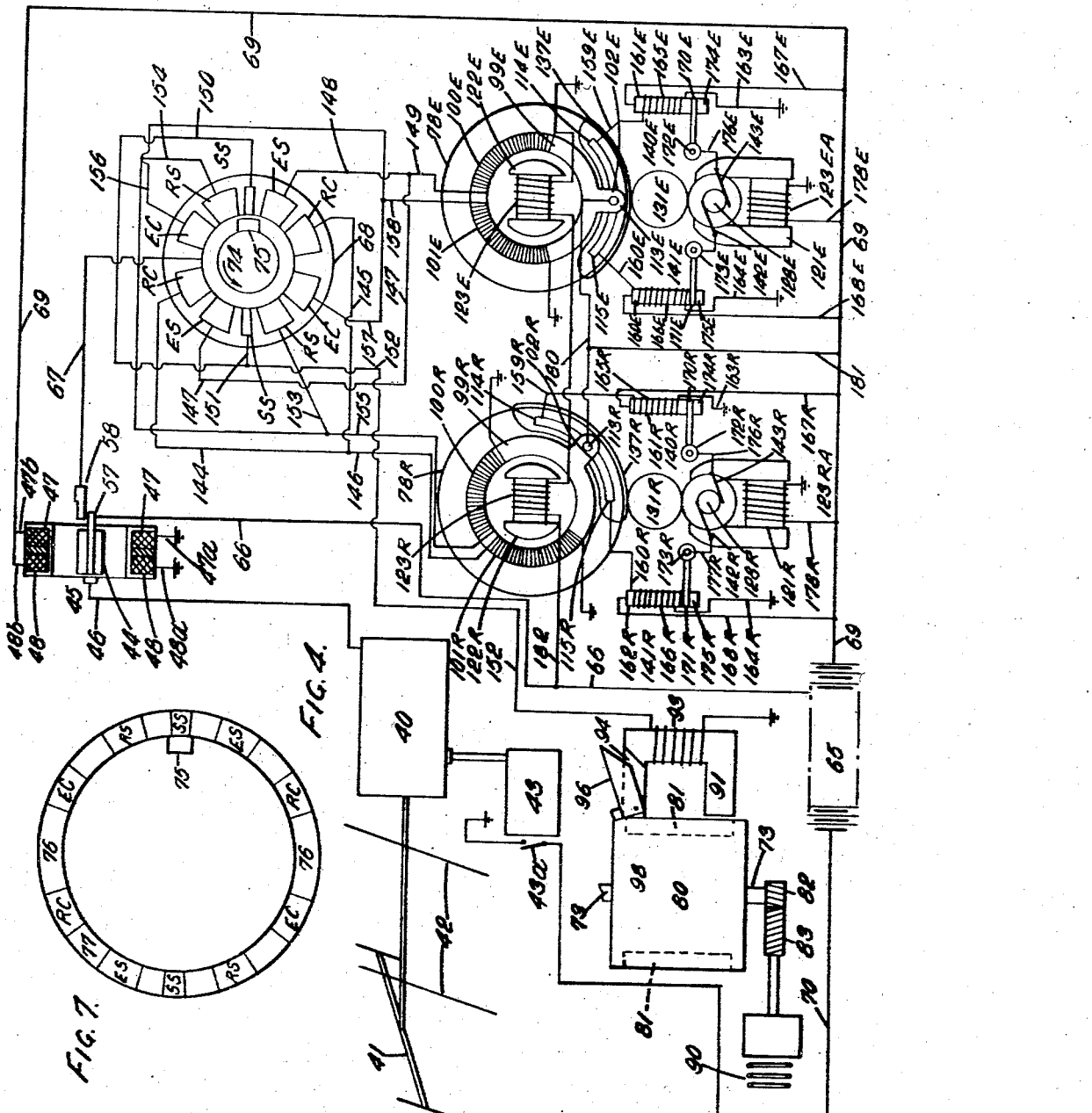

May 7, 1946.　　　　B. THOMSON　　　　2,399,956
ELECTRIC REMOTE CONTROL SYSTEM
Filed Sept. 5, 1942　　　　6 Sheets-Sheet 3
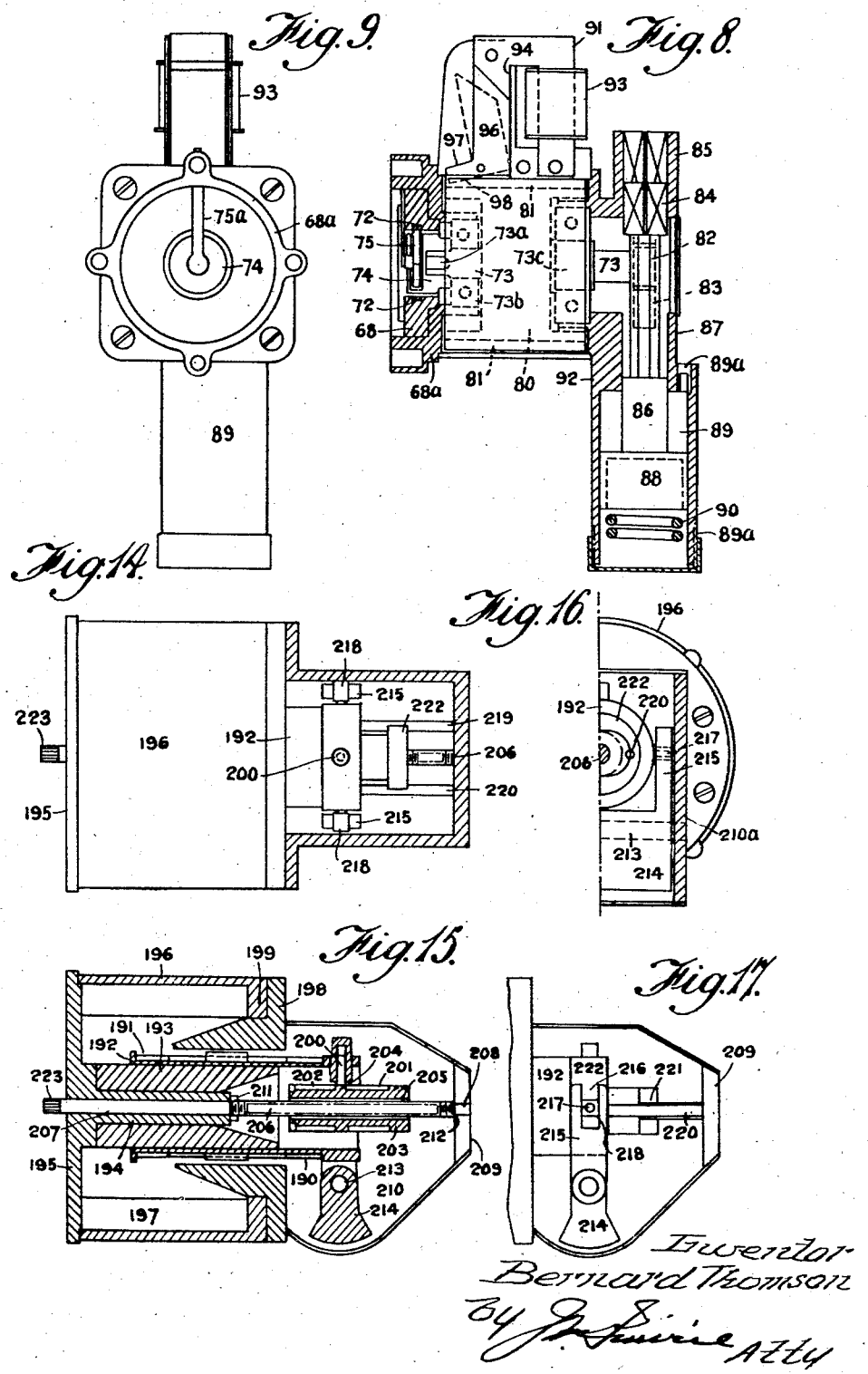

May 7, 1946.　　　　B. THOMSON　　　　2,399,956
ELECTRIC REMOTE CONTROL SYSTEM
Filed Sept. 5, 1942　　　　6 Sheets-Sheet 4

Inventor
Bernard Thomson
by J. Irvine
Atty.

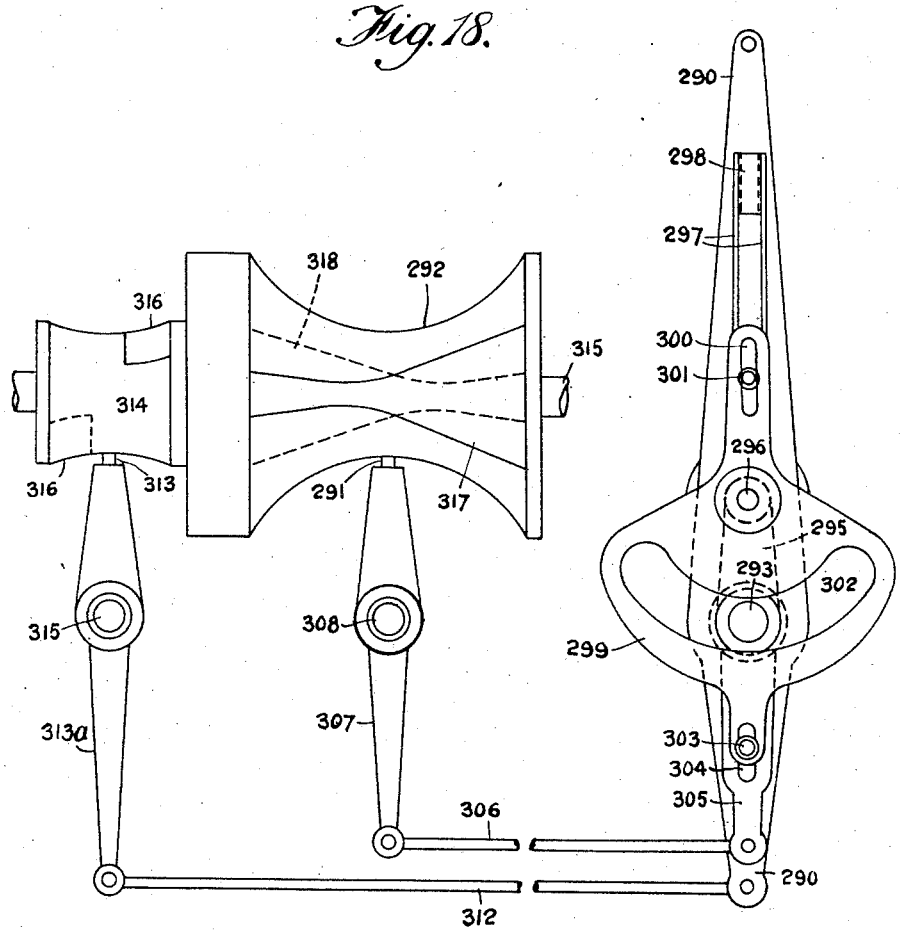

May 7, 1946. B. THOMSON 2,399,956
ELECTRIC REMOTE CONTROL SYSTEM
Filed Sept. 5, 1942 6 Sheets-Sheet 6
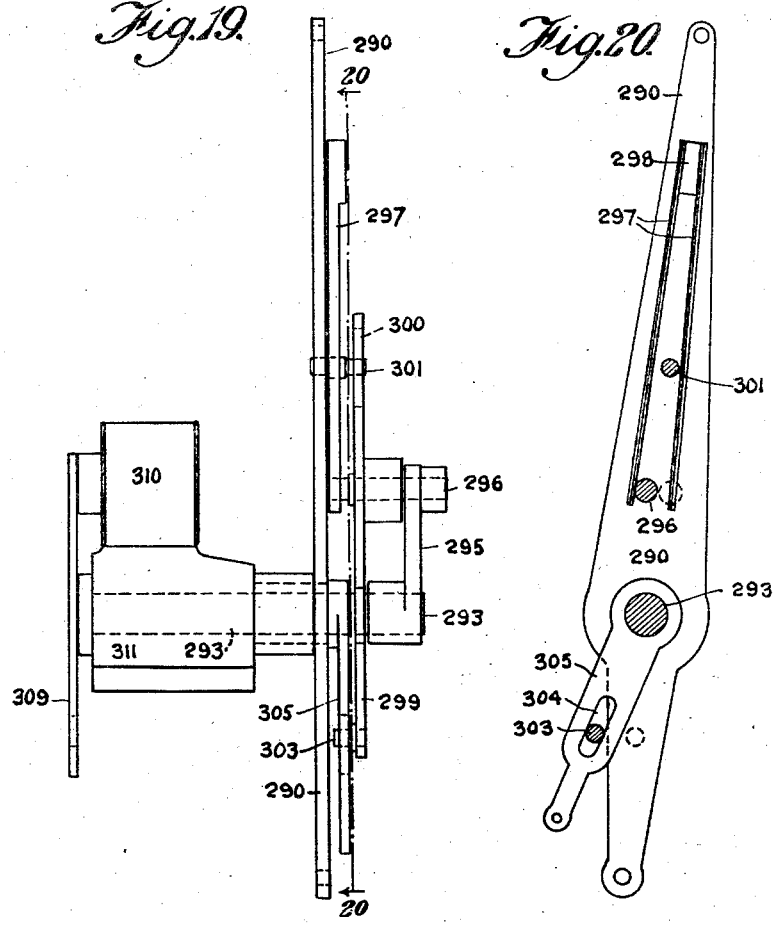
Inventor
Bernard Thomson Patented May 7, 1946

2,399,956

UNITED STATES PATENT OFFICE 2,399,956

ELECTRIC REMOTE-CONTROL SYSTEM

Bernard Thomson, London, England

Application September 5, 1942, Serial No. 457,497
In Great Britain August 13, 1941

7 Claims. (Cl. 177—353)

My invention relates to electric remote-control systems, and is especially applicable to explosive carrying weapons, such as aerial or hydro torpedoes or to crewless armoured land vehicles or to watercraft.

My invention has for its object to provide an improved electric remote-control system.

My invention consists in the electric remote-control systems as hereinafter defined in the appended claims.

Referring now to the accompanying drawings,

Figure 1 is a front elevation of a signal assembly commutator for use on an aeroplane for the remote control of an aerial torpedo.

Figure 2 is a cross-section on the line II—II in Figure 1 and also illustrates the electrical connections of the commutator with its associated wireless transmitting set.

Figure 3 is a timing diagram illustrating the signals transmitted by the operation of the commutator shown in Figures 1 and 2.

Figure 4 is a diagrammatic view of the electric circuits in a remote-controlled aerial torpedo and apparatus associated therewith.

Figure 5 is an end elevation and Figure 6 is a longitudinal section of a high-speed torsion coil make and break device, illustrated diagrammatically in Figure 4.

Figure 7 is a view of the contact segments of the distributor illustrated diagrammatically in Figure 4.

Figure 8 is a side elevation partly in section, and Figure 9 is an end elevation of the combined distributor and synchronizing device illustrated diagrammatically in Figure 4.

Figure 10 is a vertical section of the controller for the rudder and elevator operating mechanisms illustrated diagrammatically in Figure 4, while

Figure 14 is a plan, partly in section, of a modified form of controller for the rudder and elevator operating mechanisms.

Figure 15 is a longitudinal section of the controller illustrated in Figure 14.

Figure 16 is a part vertical section through the extension of the controller casing illustrated in Figure 15, while Figure 17 is a sectional elevation of this extension.

Figure 18 is an arrangement for temporarily enhancing the value of the signals.

Figure 19 is an end elevation of the escapement mechanism shown in Figure 18.

Figure 20 is a section on the line 20—20 of Figure 19.

Figure 12:
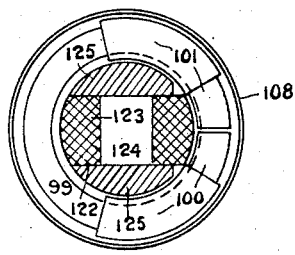
Figure 12 is a section on the line XII—XII in Figure 10.
Figure 13:
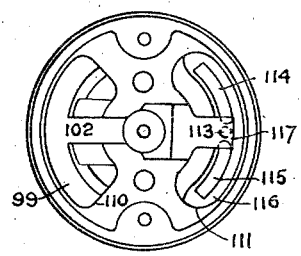
Figure 13 is a section on the line XIII—XIII in Figure 10.

In carrying my invention into effect, according to one form, and as applied by way of example to the remote control of an aerial torpedo formed as a glider, the torpedo is fitted with a gyroscope for stabilizing it laterally in known manner, and is also fitted with aerodynamic rudder and elevator such for example, as described in my application Serial No. 398,679, filed on the 18th of June, 1941. The rudder and elevator controls of the torpedo are arranged to be operated in a manner hereinafter described by signals and countersignals transmitted from a wireless transmitting set carried on the aeroplane controlling the flight of the torpedo.

The signals and countersignals are assembled manually on a commutator 1, Figures 1 and 2, fixed on a rotatable shaft 2 which is driven by an electric motor at constant speed, for example, at any selected speed between 1200 and 1800 revolutions per minute, means being provided for maintaining the speed of the motor constant in known manner. The commutator 1 is formed in two parts, viz., a slip-ring 3 and a waisted bobbin-like part 4 having cylindrical end portions 5 and 6 at its opposite ends. The slip-ring 3 is attached to the end portion 6 and on its inner end face has an axially-extending projection 7 formed thereon which is sunk so as to be flush with or so as to slightly project above the surface thereof. The part 4 of the commutator 1 is formed of insulating material, while the slip-ring and its axial projection 7 are formed of metal.

Segments 8 and 9 of metal are inlaid in the part 4 so as to be flush with the surface thereof or so as to slightly project above the surface thereof, these segments being spaced angularly at angles of 180 degrees apart on the periphery of the commutator 1 and extending axially over substantially the whole length of the part 4. The end 10 of the segment 8 extends circumferentially through an angle of 60 degrees, while its opposite end 11 extends through an angle of 20 degrees. Similarly, the end 12 of the segment 9 extends through an angle of 60 degrees, while the end 13 of this segment extends through an angle of 20 degrees. The segments 8 and 9 are oppositely disposed on the commutator 1 so that the segment 8 is arranged with its wide end 10 adjacent to the end portion 6 of the commutator, and its narrow end 11 is adjacent to the end portion 5, while the segment 9 is arranged with its wide end 12 adjacent to the end portion 5 of the commutator and with its narrow end 13 adjacent to the end portion 6 thereof.

A stationary carbon feed brush 14 is mounted in the commutator casing and contacts continuously with the slip-ring 3. The feed brush 14 is connected by the lead 15 to the negative terminal of a high-tension battery 16 of which the positive terminal is earthed to the metal frame of the aeroplane carrying the commutator 1 and its associated apparatus. The slip-ring 3 is electrically connected by leads 17 and 18 with the segments 8 and 9 of the commutator 1, the leads 17 and 18 being arranged internally in the part 4 of the commutator. The axial projection 7 of the slip-ring 3 makes contacts with a carbon brush 19 once in every revolution of the commutator 1. The brush 19 is also mounted in the commutator casing.

Carbon brushes 20 and 21 are mounted in holders 22 and 23 which are secured to the spindles 24 and 25 rotatably mounted in the commutator casing. The spindles 24 and 25 are provided with cranks 26 and 27 so that by partially rotating the spindles 24 and 25 the brushes 20 and 21 may be swung so as to sweep over the part 4 of the commutator 1 and may be positioned at will so as to contact with any desired points in the lengths of the segments 8 and 9. The brush 21 contacts with the commutator 1 on the horizontal centre line thereof and is disposed at an angle of 108 degrees in advance of the brush 20 in the direction of rotation of the commutator.

When the commutator 1 is rotating at constant speed the brushes 20 and 21 contact with the segments 8 and 9 for time intervals which vary with the displacement of the brushes from their central position. In their central positions both brushes 20 and 21 make contacts of equal duration with both of the segments 8 and 9. When, for example, the brush 20 is swung from its central position illustrated in Figure 1, towards the end 6 of the commutator 1, the duration of its contacts with the segment 9 is decreased, while the duration of its contacts with the segment 8 is increased in relation to the duration of its contacts with these segments when it is in its central position. When the brush 20 is swung from its central position in the opposite direction to that above described, the duration of its contacts with the segment 8 is decreased while the duration of its contacts with the segment 9 is increased in relation to the duration of its contacts with these segments when in its central position. Similarly, if the brush 21 is swung from its central position towards the end 6 of the commutator 1, the duration of its contacts with the segment 8 is increased, while the duration of its contacts with the segment 9 is decreased in relation to the duration of its contacts with these segments when in its central position. When the brush 21 is swung from its central position in the opposite direction, the duration of its contacts with the segment 8 is decreased, while the duration of its contacts with the segment 9 is increased in relation to the duration of its contacts with these segments when in its central position. The contacts which the brush 19 makes with the axial projection 7 of the slip ring 3 are of constant duration.

The brushes 20 and 21 are connected by a common lead 28 and through a cut-out switch 29 to the lead 30 which connects the brush 19 to the grids of the modulation valves (only one of which is illustrated) of a wireless transmitting set 32 provided with an oscillator 33 which is connected to the second grid of the modulation valves 31. The wireless transmitting set 32 may be of the Lecher wire or any other suitable short-wave type operating with wave-lengths between say 3 and 6 metres and with a separation of about 3 megacycles between wave-lengths for different torpedoes.

As the segments 8 and 9 and the projection 7 during a revolution of the commutator 1 make and break the circuits including the brushes 19, 20 and 21, the high-tension battery 16 and the modulation valves 31 of the transmitting set 32 after the switch 29 has been closed, periods of modulation of the carrier wave transmitted by the transmission set 32 are effected, the duration of such periods varying with the duration of the contacts between the brushes 20 and 21 and the segments 8 and 9, while uniform periods of modulation of the carrier wave are effected by the contacts of the brush 19 with the axial projection 7.

When the brush 20 makes contact with the segment 8 it transmits a rudder signal and when it makes contact with the segment 9 it transmits a rudder countersignal. Similarly, when the brush 21 makes a contact with the segment 8 it transmits an elevator signal and when it makes contact with the segment 9 it transmits an elevator countersignal.

As hereinafter described a rudder signal tends to cause the rudder operating mechanism in the torpedo to move in the opposite direction to that in which the rudder countersignal tends to cause this mechanism to move, and the elevator signals and countersignals act in a similar manner in relation to the elevator operating mechanism. The terms signal and countersignal have been adopted to differentiate the signals for descriptive purposes.

The signals transmitted on contact of the brush 19 with the axial projection 7 are used for driving a distributor to be hereinafter described, so as to maintain a constant velocity ratio between it and the commutator 1.

In the example being described the rudder and elevator signals and countersignals transmitted in each revolution of the commutator 1 form two interlaced pairs and starting with a rudder countersignal, for example, the signals are transmitted in the following sequence.

(I) A rudder countersignal.
(II) An elevator signal.
(III) A synchronizing signal.
(IV) A rudder signal.
(V) An elevator countersignal.

When the brushes 20 and 21 are in their central positions, which correspond to the neutral positions of the rudder and elevator, both rudder and elevator signals and countersignals are of the same duration. In Figure 3 is shown a timing diagram of the signals transmitted by the commutator 1, the diagram extending for two revolutions of the commutator and commencing with the elevator signal. In this figure the row 35 of signals illustrates those transmitted when both of the brushes 20 and 21 are in their central positions. The elevator signal is designated by ES, the synchronizing signal by SS, the rudder signal by RS, the elevator countersignal by EC, the rudder countersignal by RC and so on. The above series of signals are repeated at the rate, for example, of 20 times per second so long as the commutator continues to run with the brushes 20 and 21 in their central positions and with the switch 29 closed. In the row of signals 35 it will be seen that the rudder and elevator signals and countersignals are all of the same length and are spaced as shown.

The row 36 of signals illustrates the signals transmitted when the brush 21 is in its central position, while the brush 20 is displaced from its central position towards the right Figure 1, for the transmission of a "port rudder" signal. In the row 36 of signals it will be seen that the rudder signal RS is of greater length or duration than the rudder countersignal RC. The row 37 of signals, Figure 3, shows the signals transmitted when the brush 20 is displaced from its central position as shown in Figure 1, toward the left for the transmission of a "starboard rudder" signal, and it will be observed that the rudder countersignal RC is of greater length or duration than the rudder signal RS. Similar movements of the brush 21 cause the elevator signals and countersignals to vary in a similar manner.

The aerial torpedo is provided with a short-wave wireless receiving set 40, Figure 4, of any suitable type. The receiving set 40 is equipped with an aerial 41 and reflectors 42 so as to prevent interference from wireless sets on the ground. The aerial 41 may have a pair of di-poles as shown or the aerial may be an end-fire fishbone array as used in radio locators. The receiving set 40 is also fitted with a time switch 43 which prevents reception by the receiving set until after a time interval of from 10 to 15 seconds has elapsed from the instant the torpedo has been dropped from the aeroplane controlling its flight, and also closes the switch 43a which connects the negative terminal of the battery 65 to earth, in this case the metal shell of the torpedo.

Signals received by the aerial 41 pass to the wireless receiving set 40 when the time switch 43 has been closed, and from thence to an armature 44 of a high speed make and break device 45, Figure 4, connected in series in the output circuit of the receiving set 40 by the lead 46. The device 45, shown in detail in Figures 5 and 6, has two field coils 47 and 48 which are arranged one on each side of a light alloy apertured core 49, and the core and coils are assembled on a brass flanged sleeve 50 and clamped in position thereon by an annular disc 51. The core 49 is formed in two parts which are attached together by screws 52. The field coils 47 and 48 are connected in parallel as hereinafter described.

The armature 44 of the device 55 is rigidly attached to a spindle 53. The spindle 53 is pivoted at one end on the adjacent end of a pin 54 screwed into the core 49 so as to be adjustable, the pin being provided with a nut 55 at its opposite end for securing it in its adjusted position. The other end of the armature spindle 53 which is of "Duralumin" is rigidly fixed in a bracket 56 secured to the core 49. The armature 44 is provided with two coils in parallel and these coils are connected on the one hand in the output circuit of the receiving set 40 by the lead 46 and on the other hand are earthed. A contact 57 projects laterally from the armature 44. The contact 57 is adapted to move into contact with a second adjustable contact 58 when the armature spindle 53 is subjected to torsion by the signal currents in the output circuit of the receiving set 40 as hereinafter described. The contacts 57 and 58 are normally set at about 6 thousandths of an inch apart. The contact 58 and an arm 59 are insulated from one another by a washer 60 of insulating material and they are bolted to a projection 61 of the flanged sleeve 50 by means of a bolt 62, a distance piece 63 of insulating material being inserted between the arm 64 carrying the contact 58 and the projection 61. The arm 59 acts as a stop for limiting the clockwise movement of the contact 57 about the axis of the armature as viewed in Figure 6.

The contact 57, Figure 4, of the armature 44 is connected to the main battery 65 by the lead 66, while the contact 58 co-acting therewith is connected by the lead 67 to a distributor 68 for the signals. The ends 47a and 48a of the coils 47 and 48 are connected by a lead 69 to the positive terminal of the main battery 65. The negative terminal of the battery 65 is connected through the lead 70 and switch 43a to earth.

When signals from the output circuit lead 46 pass to the armature 44 of the make and break device 45, the reaction of the armature and field magnet of the device causes the armature 44 to subject its spindle 53 to torsion, with the result that the contact 57 closes on the contact 58 thereby permitting current from the main battery 65 to pass to the distributor 68 by way of the lead 66, contacts 57 and 58 and lead 67. The device thus acts as an amplifier of the signal currents in the output circuit of the receiving set 40. Since the signal currents picked up by the receiving set 40 are of variable duration corresponding to the control movements required, the intervals of closure of the contacts 57 and 58 are thus correspondingly varied to the duration of the signals and countersignals.

The distributor 68, Figures 4, 7, 8 and 9, is shown in Figure 4 for purposes of illustration separate from the synchronizing device to be hereinafter described, but in practice they are preferably combined in a single structure as illustrated in Figures 8 and 9. The distributor 68 has ten spaced contact segments 72 arranged in the form of a ring, the segments being insulated from one another. A shaft 73 is mounted so as to be co-axial with the ring of contact segments 72. The shaft 73 drives through a hexagonal couping 73a a brush holder 74 carrying a carbon brush 75 so that the brush holder and brush rotate along with the shaft 73 and the brush wipes the inner circumferential faces of the segments 72 in succession. Two of the contact segments 72, Figure 7, are arranged symmetrically about the horizontal diameter of the ring formed by the contact segments, and are of less circumferential length than the remaining contact segments of the ring which are all of equal circumferential length. Two equal spaces 76 are arranged diametrically opposite to each other about the vertical diameter of the ring of contact segments 72 and are of greater circumferential length than the spaces between the remaining segments of the ring. The contact segments 72 are arranged in two groups of five, one group being on one side of the vertical diameter and the other group being on the opposite side thereof.

The contact segments 72 are for the distribution of the signals and countersignals indicated thereon in Figures 4 and 7, viz., proceeding in the anti-clockwise direction from the top, rudder countersignal RC, elevator signal ES, synchronizing signal SS, rudder signal RS and elevator countersignal EC, the distribution of these signals being repeated in the same sequence on the remaining half of the distributor. The distributor shaft 73 and the brush-holder 74 and brush 75 are arranged to rotate at half the speed of the signal assembly commutator 1 on the controlling aeroplane. The contacts RS and RC for rudder control are connected to the rudder controller 78R, Figure 4, while the contact segments ES and EC for elevator control are connected to the elevator controller 78E. The controllers 78R and 78E will be hereinafter described in detail.

The shaft 73, Figures 4, 8 and 9, driving the brush-holder 74 of the distributor 68 also carries a flywheel 80 of brass rigidly attached thereto and having two iron segments 81 fitted in the circumference thereof. At one of its ends the shaft 73 has a toothed pinion 82 fixed thereon. The pinion 82 is capable of being engaged with and disengaged from a rack 83 which has one of its ends 84 of square section. The square end 84 of the rack 83 is slidable in a similarly formed guide 85. The other end of the rack 83 is formed with an intermediate cylindrical portion 86 which slides in a guide 87 of circular section and has a piston 88 formed on its outer end. The piston 88 slides in a cylinder 89 provided with vents 89a and between the piston and the end of the cylinder a helical spring 90 is interposed. The cylinder 89, guide 87 and guide 84 are formed integrally with one another as a casting 92 which carries one of the bearings 73c for the shaft 73, the other bearing 73b of this shaft being carried by the distributor casing 68a.

A U-shaped electromagnet 91 is mounted on the casting 92 and on the casing 68a of the distributor 68. A coil 93 is arranged on one of the limbs of the electromagnet 91, while its opposite limb 94 is split, one part being pivotally mounted and carrying a catch 96. The catch 96 is provided with a tooth 97 which is capable of engaging with a notch 98 in the rim of the flywheel 80. One end of the coil 93 is earthed, Figure 4, to the shell of the torpedo, while the other end of this coil is connected to both of the contacts SS of the distributor 68. The brush-holder 74 is provided with a pointer 75a for indicating the position of the brush 75.

In Figures 10 to 13 the construction of the controllers for rudder and elevator is illustrated in detail, while in Figure 4, these controllers and their connections are diagrammatically illustrated. In Figures 10 to 13 a ring 99 of magnectically permeable material has two two-section coils 100 and 101 wound thereon. The ring 99 is of channel section and has an arm 102 rigidly connected thereto. The arm 102 has a pivot pin 103 fixed therein and the ends of this pivot pin are mounted in bearings 104 and 105. The bearing 104 is mounted in the cover 106 of the head 107 of the controller casing 108, while the bearing 105 is mounted in the lower end 109 of the head 107.

Apertures 110 and 111 are formed in the end 109 of the head 107 to allow for the movement of the arm 102 during the operation of the controller. The free end of the arm 102 is formed with a boss 112 in which a spring-mounted carbon brush is fitted. The brush 113 is adapted to co-act with arcuate contact segments 114 and 115 spaced apart at their adjacent ends, the contact segments being inserted in a block of insulating material 116 attached to the circumferential wall of the controller casing 108. The arcuate contact segments 114 and 115 are concentric with the pivot axis of the arm 102. In the central position of the ring 99 the brush 113 is in contact with the part 117 of the block 116 interposed between the adjacent ends of the arcuate contact segments 114 and 115 so that in this position the arm 102 is insulated from these segments. The base plate 118 of the casing 108 is mounted on the cover plate 119 of the casing 120 of the electric motor 121. The casing 108 is rotatable relatively to its head 107 and its base plate 118.

Within the ring 99 is arranged the field magnet 122 which is of H-section, and the field coil 123 is wound round the cross-member 124 connecting the pole-pieces 125. The pole-pieces 125 are secured by screws 126 to the head 107 of the controller casing 108 and are also secured by screws 127 to the base plate 118 of this casing.

Figure 10:
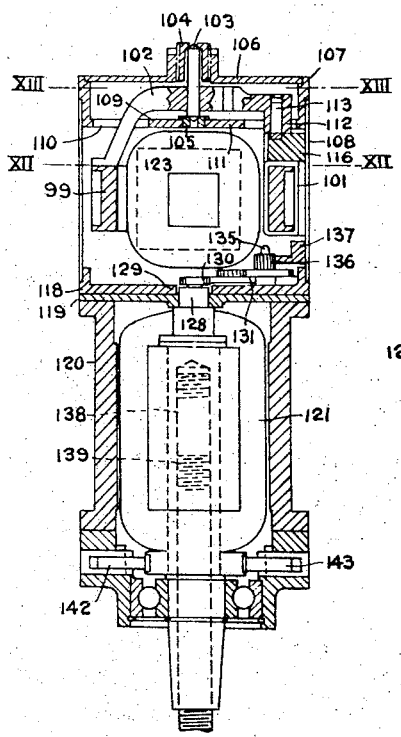

The armature spindle 128 of the motor 121 projects through a hole 129, Figure 10, in the base plate 118 of the controller casing 108 and carries a pinion 130 rigidly attached thereto. The pinion 130 drives through intermediate gearing 131 a pinion 136 mounted on a spindle 135 fixed to the base plate 118 of the casing 108, and the pinion 131 meshes with an internally toothed arcuate rack 137 rigidly fixed to the controller casing 108. The gearing between the pinion 130 and the arcuate rack 137 constitutes a follow-up mechanism for the controller casing 108 and the arcuate contact segments 114 and 115 carried thereon so that these segments follow-up the movements of the brush 113 on the arm 102 fixed to the ring 99.

Figure 11:
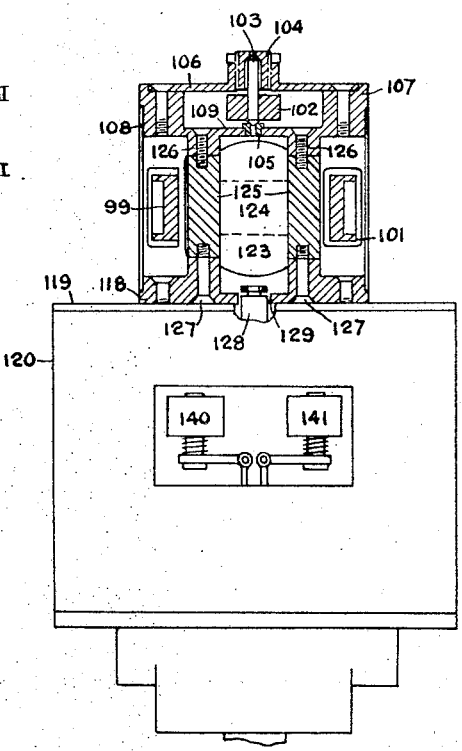
Figure 11 is an elevation partly in section of the controller for the rudder and elevator operating mechanisms illustrated in Figure 10.

The armature spindle 128 of the motor 121 has a screw-threaded hole 138 formed therein, and with this hole engages the screw-threaded spindle 139 for actuating the rudder through suitable mechanism. On the motor 120 two electric switches 140 and 141 are arranged as shown in Figure 11 and by means of these switches the direction of the current through the carbon brushes 142 and 143 co-acting with the armature of the motor 121 may be controlled according to the signals received by the controller. The direction of rotation of the armature spindle 128 of the motor 121 may thus be readily reversed as required.

The connections of the controllers for rudder and elevator operation with the distributor 68 and with their motors are illustrated in Figure 4 and similar parts of the controllers are indicated by the same reference numerals as has been used in the description with reference to Figures 10 to 13. In Figure 4 the parts associated with the rudder controller have the suffix "R" added to the reference numeral, while the parts associated with the elevator controller have the suffix "E" added to the reference numeral.

Referring now to Figure 4, the two segments RC of the distributor 68 are connected by leads 144 and 145 to a common lead 146 which is connected to one end of the coil 101R on the ring 99R of the rudder controller 78R, the other end of the coil being earthed. The two segments ES of the distributor 68 are connected by leads 147 and 148 to a common lead 149 which is connected to one end of the coil 100E of the ring 99E of the elevator controller 78E, the other end of this coil being earthed. The two segments SS of the distributor 68 are connected by leads 150 and 151 to a common lead 152 which passes to the coil 93 of the electromagnet 91 of the synchronizing device, the other end of this coil being earthed. The two segments RS of the distributor 68 are connected by leads 153 and 154 to a common lead 155 which is connected to one end of the coil 100R on the ring 99R of the rudder controller 78R. The other end of the coil 100R is earthed. The two segments EC of the distributor 68 are connected by leads 156 and 157 to a common lead 158 which is connected to one end of the coil 101E of the ring 99E of the elevator controller 78E, the other end of the coil 101E being earthed.

The arcuate contact segments 114R and 115R are connected by leads 159R and 160R to the upper ends of the coils 161R and 162R of the electromagnetic switches 140R and 141R, while the lower ends of these coils are earthed by the leads 163R and 164R. The cores 165R and 166R of the electromagnetic switches 140R and 141R are connected by leads 167R and 168R to the lead 69 which is connected to the main battery 65.

With the electromagnetic switches 140R and 141R co-act armatures 170R and 171R pivoted at 172R and 173R respectively, and normally these armatures rest upon fixed contacts 174R and 175R which are connected to earthed leads 163R and 164R. The armatures 170R and 171R are connected at their pivoted ends by leads 176R and 177R to the brushes 142R and 143R of the motor 121R for operating the rudder controls. The field coil 123RA of the motor 121R is connected at one end by the lead 178R to the main battery lead 69 and at its other end is earthed. Follow-up gearing 131R connects the armature spindle 128R with the rack 137R fixed to the casing 108R of the rudder controller 78R. The lead 180 is connected by a lead 181 with the main battery lead 69.

The field coil 123R of the field magnet 122R of the controller 78R is connected at one end to a lead 182 which is jointed to the lead 66 from the battery 65 to the contact 57 of the make and break device 45. The other end of the field coil 123R is connected by a lead 183 to one end of the coil 123E of the field magnet 122E of the elevator controller 78E. The other end of the field coil 123E is earthed so that the field coils 123R and 123E are connected in series.

The electrical connections of the elevator controller 78E with its motor 121E and its electromagnetic switches 140E and 141E are similar to those of the rudder controller 78R with its motor 121R and its electromagnetic switches 140R and 141R just described.

The operation of the arrangement of remote control hereinbefore described is as follows:

Before the aerial torpedo is mounted on the controlling aeroplane, the pivoted catch 96, Figures 4 and 9, on the limb 94 of the electromagnet 91 associated with the flywheel 80 on the distributor shaft 73 is engaged with the notch 98 on the flywheel when the distributor brush 75 is in contact with one of the synchronizing contact segments SS of the distributor 68, and the shaft is thus held in position. Before the engagement of the catch 96 with the notch 98 has been effected, the spring-operated rack 83 had been engaged with its co-acting toothed pinion 82 on the distributor shaft 73 and the piston 86 carried by the rack forced into the cylinder 89 so as to compress the helical spring 90 to its fullest extent before the engagement of the catch 96 and the notch 98 is effected. The rack 83 is thus held in engagement with its pinion 82 and with the spring 90 fully compressed.

A short time before the torpedo is to be dropped from the aeroplane carrying it, the signal assembly commutator 1 on the aeroplane is run up to its desired constant speed, the brushes 20 and 21 having been previously set in their central positions and the switch 29 having been opened, so that before closing the switch 29 only synchronizing signals can be transmitted from the transmitting set 32.

After the commutator 1 has been run up to its constant speed and when the time has arrived for releasing the torpedo, it is dropped from the aeroplane. At the moment of release, the time switch 43 in the receiving set 40 in the torpedo automatically starts to operate so that the receiving set will not be switched in until say 15 seconds after the release of the torpedo.

When the 15 seconds have elapsed, the receiving set 40 in the torpedo is cut in by the time switch 43 which also closes the switch 43a connecting the negative terminal of the battery 65 to earth. To commence with, only synchronizing signals are received by the receiving set 40 as although the switch 29 is in the open position the brush 19 is still in circuit with the grids of the modulation valves 31 in the transmitting set 32. These synchronizing signals pass through the coils of the armature 44 of the make and break device 45 connected in the low frequency or output circuit of the receiving set 40 by the lead 46. When the valves in the receiving set 40 have warmed up, the synchronizing signals become sufficiently strong to cause the contacts 57 and 58 associated with the device to close for time intervals equal to the duration of the individual synchronizing signals. The duration of the individual synchronizing signals is that of the time interval during which the brush 19 is in contact with the axial projection 7 during each revolution of the commutator 1, and on the reception of each synchronizing signal the contacts 57 and 58 make a single closure.

The first closure of the contacts 57 and 58 causes a current impulse from the main battery 65 to pass through lead 66, contacts 57 and 58, lead 67 to the brush 75 of the distributor 68 and thence to the contact segment SS of the distributor with which it is held in contact. From the contact segment SS the current impulse passes through the leads 152 and 150 to the coil 93 of the electromagnet 91 associated with the flywheel 80 on the distributor shaft 73 and then to earth. The electromagnet 91 is consequently energized and the pivoted catch 96 associated therewith is magnetically disengaged from its co-acting notch 98 in the flywheel 80 so that the latter together with the distributor shaft 73 are now free and are run up to half of the speed of the signal assembly commutator 1 in a time interval equal to that of one revolution of the commutator, by the spring-operated rack 83 and its co-acting pinion 82 which runs off the rack at the end of the stroke of the latter. The rack 83 is thus disengaged from the pinion 82 and remains in the disengaged position.

At the moment of disengagement of the pinion 82 from the rack 83 one of the iron segments 81 of the flywheel 80 is entering the magnetic field of the electromagnet 91, and the distributor brush 75 is making contact with the other synchronizing contact SS of the distributor 68, which segment is also connected to the electromagnet 91 through the leads 151 and 152. The electromagnet 91 is thus energized again by the synchronizing impulse and also by subsequent synchronizing impulses transmitted twice in each revolution of the distributor shaft 73. The arrangement thus acts as a synchronous motor running at half of the speed of the signal assembly commutator 1 so that the distributor 68 is electrically geared to the commutator, the ratio being 1:2.

The circuits of the brushes 20 and 21 on the signal assembly commutator 1 as hereinbefore described which connect them with the grids of the modulation valves 31 of the transmitter set 32 are now closed by operating the switch 29 so that the commutator 1 now transmits five signals per revolution, viz., a rudder countersignal, an elevator signal, a synchronizing signal, a rudder signal and an elevator countersignal, and these signals are continuously transmitted during the whole period in which the aerial torpedo is under control. As the brushes 20 and 21 are in the central position the rudder signals and countersignals are all of equal duration, the duration of a signal or countersignal being the time interval absorbed when one of the brushes 20 or 21 makes a single contact with one of the segments 8 or 9 on the commutator 1.

When a rudder countersignal is transmitted from the signal assembly commutator 1 by the contact of the brush 20 with the segment 9, it is received by the receiving set 40 in the torpedo. The contacts 57 and 58 associated with the make and break device 45 are closed for a time interval equal to that of the contact of the brush 20 with the segment 9, and as at this instant the distributor brush 75 is in contact with one of the rudder countersignal contact segments RC of the distributor 68, a current impulse passes from the main battery 65 to the distributor brush 75 by way of the lead 66, contacts 57 and 58 and lead 67, and from the brush 75 to the rudder countersignal segment RC in contact therewith. From the contact segment RC the impulse passes by way of the lead 144 or 145 and lead 146 to the countersignal coil 101R on the ring 99R of the rudder controller 78R and energizes it and then passes to earth. The action of the energized coil 101R tends to cause the ring 99R to rotate in the clockwise direction. Before, however, the ring 99R can make an appreciable rotational movement in response to this current impulse, the signal coil 100R of the ring 99R of the controller 78R will have been energized by the following rudder signal transmitted by the contact of the brush 20 with the segment 8 of the commutator 1 as the commutator rotates farther, and as the action of the energized coils 101R and 100R on the ring 99R are equal and opposite to each other, owing to the signals and countersignals being of equal duration, the only action of the combined effect of these energized coils on the ring is to cause it to make slight oscillations. The brush 113R attached to the ring 99R also makes slight oscillations but as these are made in the gap between its associated arcuate contact segments 114R and 115R, no actuation of the rudder control motor 121R takes place.

When the elevator signal following the rudder countersignal is received by the receiving set 40, consequent upon the contact of the brush 21 with the segment 8 of the commutator 1, the contacts 57 and 58 associated with the make and break device 45 are again closed for a time interval equal to the duration of the transmitted signal, while the distributor brush 75 is in contact with the elevator signal contact EC of the distributor 68 next to the rudder countersignal contact RC which has just been swept by the brush 75. A current impulse from the battery 65 equal in duration to the transmitted signal now passes by way of the leads 66 and 67 to the distributor brush 75 and to the elevator signal contact segment EC in contact therewith, and from thence by way of lead 147 and 148 and lead 149 to the signal coil 100E on the controller ring 99E of the elevator controller 78E. The action of the current impulse on the signal coil 100E of the ring 99E tends to cause this ring to rotate in the anti-clockwise direction but before the ring 99E can make any appreciable movement in response to the elevator signal impulse, the coil 101E is energized by the following elevator countersignal current impulse, and as the action of the energized coils 100E and 101E on the ring 99E are equal and opposite to each other, their only action on the ring 99E is to cause it to make slight oscillations, and also its brush 113E. The oscillations of the brush 113E are made opposite to the gap between the adjacent ends of the arcuate contact segments 114E and 115E without having any operative effect on the elevator control motor 121E.

Following the elevator signal, the brush 19 makes contact with the axial projection 7 of the slip ring 3 on the commutator 1 and thereby a synchronizing signal is transmitted by the transmitting set 32. The operations which take place on the reception of a synchronizing signal by the receiving set have already been described as well as the means by which they maintain a constant velocity ratio of the commutator 1 and the distributor 68.

After the synchronizing signal has been transmitted by the transmitting set, the next signal to be transmitted by the transmitting set is a rudder signal which is effected when the brush 20 makes contact with the segment 8 of the commutator 1. During this contact the distributor brush 75 is in contact with one of the rudder signal contact segments RS of the distributor. On the reception of this signal by the receiving set 40, the make and break device 45 is operated to cause a current impulse to pass from the battery 65 by way of lead 66, contacts 57 and 58, and lead 67 to the distributor brush 75, and to the rudder signal contact segment with which it is in contact. From the segment RS the impulse passes by way of lead 153 or 154 and lead 155 to the coil 100R on the ring 99R of the rudder controller 78R and thence to earth. The action of the energized coil 100R is to tend to cause a rotational movement of the ring 99R in the clockwise direction, but owing to the following rudder countersignal, as previously explained, no operative action of the rudder control motor 121R takes place.

The next signal to be transmitted is an elevator countersignal which occurs when the brush 21 makes contact with the segment 9 on the signal assembly commutator 1. The reception of this signal by the receiving set 40, its operation of the make and break device 45 and the passage of a corresponding current impulse from the battery 65 to the distributor 68 are similar to those for the signals and countersignals previously described. In this case the impulse passes from the operative contact segment EC of the distributor 68 by way of lead 156, or 157, and lead 158 to the coil 101E on the ring 99E of the elevator controller 78E and as previously explained no action of the elevator control motor 121E takes place for similar reasons to those above set forth.

It will be understood that during the next revolution of the signal assembly commutator 1 with the brushes 20 and 21 still in their central positions, the same set of operations will be performed and in the same sequence as above described, the only difference being that the distributor brush 75 in the second revolution will make contacts with the second set of contact segments of the distributor, while in the third revolution of the signal assembly commutator 1, the distributor brush 75 will make contact again with the first set of contact segments above described and so on so long as the commutator and distributor continue to run with the brushes in the above positions.

When the positions of the brushes 20 and 21 on the signal assembly commutator are changed so as to transmit operative signals or countersignals the sequence of the signals and their transmission and reception are the same, but the effect of the operative signals and countersignals on the rudder and elevator controllers will be different and will now be described.

If, for example, it is desired to transmit an operative rudder signal, for example, a "starboard rudder" signal, the brush 20 is swung say, to the left of its central position on the signal assembly commutator 1 through an angle corresponding to the degrees of starboard rudder required. This results in the contacts of the brush 20 with the segment 8 becoming progressively longer and its contacts with the segment 9 becoming progressively shorter during the movement of the brush into its new position. Consequently, the rudder signals transmitted by the commutator progressively increase in duration, while the rudder countersignals progressively decrease in duration. On the reception of the rudder signals by the receiving set 40, the duration of the closures of the contacts 57 and 58 of the make and break device 45 progressively increase, while in the reception of the countersignals the closures of these contacts progressively decrease in duration. Current impulses of progressively increasing duration pass from the battery 65 through the distributor 68 to the coil 100R on the ring 99R of the rudder controller 78R on closures of the contacts 57 and 58 by the rudder signals as hereinbefore described. On the other hand, current impulses of progressively decreasing duration pass through the distributor 68 to the coil 101R on the ring 99R of the rudder controller 78R. The paths of the rudder signal and countersignal current impulses and their action on the make and break device have already been described together with the paths of the impulses from the battery 65 through the distributor 68 to the rudder controller 78R so that it will not be necessary to describe them again at this point.

The action of these impulses on the ring 99R causes it to make a rotational movement in the anti-clockwise direction to an extent proportional to the difference in duration of the individual rudder signals and countersignals and also to the angle through which the brush 20 moves from its central position.

The rotational displacement of the ring 99R follows from the fact that it is only stable in a position where the impulses from the signal and countersignal are equal and opposite, so that when the duration of the signal is longer than that of the countersignal the interaction between the current flowing in the turns of the coil 110R and the magnetic field between the H-shaped magnet 122R and the ring 99R must be reduced and that between the current in the turns of coil 101R and the aforesaid magnetic field increased. The magnetic fields concerned exist mainly between the poles of the magnet 122R and the ring 99R and rotation of the ring 99R will cause more or less of the turns of the coils 100R and 101R to lie within their respective fields. When a long signal is sent through coil 100R and a short countersignal through coil 101R the ring 99R moves anti-clockwise more than clockwise in its oscillations until it reaches a position where the impulse long signal by small interaction balances the impulse short countersignal by large interaction. The action is similar when the countersignal is longer than the signal.

The brush 113R carried on the arm 102R of the controller ring 99R moves into contact with the arcuate contact segment 114R and current from the battery main 69 passes to the coil 161R of the electromagnetic switch 140R through leads 181 and 180, brush 113R, segment 114R and lead 159R, the current after passing through the coil 161R being earthed through the lead 163R. The armature 170R of the switch 140R is attracted to the core 165R associated therewith, and causes current from the battery main 69 to pass through lead 167R, core 165R, armature 170R and lead 176R to the lower brush 143R of the motor 121R and thence through the armature of the motor to the upper brush 142R. From the brush 142R the current passes by way of the lead 177R to armature 173R, contact 175R and lead 164R to earth. The field magnet coil 123RA of the motor 121R is connected by the lead 178R to the battery main 69, the current after passing through this coil being earthed. The motor 121R commences to rotate and swings the rudder to starboard by way of the screwed spindle 139, Figure 10, through an angle proportional to the angular movement of the ring 99R from its central position.

As the motor 121R performs its movement its armature spindle 128R moves the controller casing 108R in the anticlockwise direction through the follow-up mechanism 131R and the arcuate rack 137R, Figures 4 and 10, so that the arcuate contact segment 114R, which is fixed to the casing 108R, follows-up the movement of the brush 113R fixed to the ring 99R and breaks its contact with the brush 113R when the rudder has moved through an angle proportional to the angular movement of the ring 99R from its central position and corresponding to the movement of the brush 20 from its central position. As the rudder is operated through irreversible gearing, viz., by the screwed spindle 138, Figure 10, it is held in the position into which it has been moved so long as the position of the brush 20 on the commutator 1 remains unchanged.

If a movement of the rudder to port is now required, the brush 20 is moved back to its central position on the commutator 1, and through this position to the required angular distance to the right which corresponds to the degrees of "port rudder" required. During this movement the contacts of the brush 20 with the segment 8 of the commutator 1 progressively decrease in duration, while its contacts with the segment 9 progressively increase in duration. Accordingly the rudder signals progressively diminish while the rudder counter-signals progressively increase in duration, but the rudder signals are still greater in duration than the countersignals until the central position of the brush, in which the signals and countersignals are of equal duration, has been passed through. After passing through the central position the rudder countersignals are of greater duration than the rudder signals and the difference in duration of these signals increases with the distance of the brush from its central position.

When the movement of the brush 20 from its starboard setting commences towards the right, the ring 99R of the rudder controller 78R commences to move in the clockwise direction and follows the movement of the brush 20, since the duration of the rudder signals progressively diminishes while that of the countersignals progressively increases. Consequently the duration of the impulses from the battery 65 varies in duration with the variations in duration of the closures of the contacts 57 and 58 of the make and break device 45. The durations of the impulses which pass to the coil 100R on the ring 99R commence to diminish, while those which pass to the coil 101R on the ring 99R commence to increase with the result as stated above that the ring 99R commences to rotate in the clockwise direction.

As the ring 99R commences its clockwise rotation the brush 113R fixed to the ring moves on to the arcuate contact segment 115R from the insulated gap between the contact segments 114R and 115R on which it had been resting in the meantime. Current from the battery main 69 then passes by way of leads 181 and 180, brush 113R, contact segment 115R and lead 160R to coil 162R of the electromagnetic switch 141R and thence to earth by the lead 164R. The core 166R is thus energized and attracts the armature 171R. Current from the battery main 69 then passes through the lead 168R, core 166R, armature 171R and lead 177R to the upper brush 142R of the motor 121R, and thence through the armature of the motor 121R to the lower brush 142R of the motor and then through lead 176R, armature 170R, contact 174R to earth by lead 163R. Current from the battery main 69 passes by way of lead 178R to the field magnet coil 123RA of the motor 121R and thereafter passes to earth. As the direction of the armature current in the motor 121R has now been reversed the armature spindle 128R rotates in the opposite direction to that in which it rotated previously and the rudder is consequently swung back to its central position and then to port since it follows the movement of the brush 20 on the commutator 1. As the armature 128R rotates it drives the follow-up mechanism 131R and the arcuate rack 137R so that the casing 108R and the arcuate contact segments 114R and 115R follow up the movement of the brush 113R of the ring 99R in the clockwise direction, and when the ring has moved to a position corresponding to that of the brush 20 which movement is proportional to the difference between the duration of the countersignal and signal currents so far as its movement from its central position to port is concerned, the segment 115R breaks its contact with the brush 113R and then rests on the insulated gap between the segments 115R and 114R and accordingly stops the motor 121R.

Transmission of operative elevator signals and countersignals is effected in a similar manner to that above described for rudder signals and countersignals, and if desired both operative elevator signals and countersignals and rudder signals and countersignals may be transmitted at the same time. In the latter case both rudder and elevator controllers 78R and 78E will be in operation at the same time.

In Figures 14 to 17 a modified form of controller is illustrated in which the movement of the controller is rectilinear instead of rotational as in the controllers 78R and 78E hereinbefore described with reference to Figures 4 and 10 to 13. In Figures 14 to 17 three three-section signal coils 190 and three three-section counter-signal coils 191 are wound on a traveller 192 so that two end sections of the coils are superimposed on the central portion of the traveller. The sections of each set of coils are connected in parallel. The traveller 192 is slidably mounted on an annular pole piece 193 which is fixed on the projection 194 of the end plate 195 of the controller casing 196. Within the casing 196 is arranged a coil 197 for generating a magnetic field between the annular pole piece 193 and a second annular pole piece 198 attached to the flange 199 of the controller casing. The signal and countersignal coils are wound so that when energized they tend to move the traveller in opposite directions in the magnetic field generated between the pole pieces 193 and 198.

The traveller 192 has a carbon brush 200 mounted thereon and this brush is adapted to co-act with two contact rings 201 and 202 countersunk into a commutator 203. The commutator 203 is formed of insulating material and the adjacent ends of the rings 201 and 202 are separated by an annulus 204 forming part of the commutator. The commutator 203 has a metal liner 205 which is internally screw-threaded, rigidly secured to the commutator, and with this liner engages a screw-threaded spindle 206. The spindle 206 is rotatably mounted in a bearing 207 in the projection 194 of the end plate 195 and also in a bearing 208 formed in the end plate of an extension 210 of the casing 196. Longitudinal movement of the spindle 206 is prevented by means of a collar 211 and the shoulder 212 which bears against the end plate 209 of the extension 210.

In the side walls 210a of the extension 210 is rotatably mounted a spindle 213 which carries a counterweight 214. The counterweight 214 is formed with two arms 215 which at their upper ends are formed with slots 216. The traveller 192 has two diametrically opposite pins 217 projecting therefrom, and on these pins are mounted slide blocks 218 which are slidable in the slots 216 of the arms 215. The commutator 203 is prevented from rotating by means of two pins 219 and 220 fixed in the end plate 209 of the extension 210 and engaging with grooves 221 on the end 222 of the commutator. The spindle 206 is provided with splines 223 which engage with corresponding splines on the end of the armature shaft of the motor which actuates the rudder or elevator operating mechanism in the manner previously described.

The signal and countersignal coils 190 and 191 are connected to the distributor 68 in the same manner as described for the coils 100R and 101R hereinbefore described in connection with the arrangement illustrated in Figure 4, and in the central position of the traveller as illustrated in Figure 15 the brush 200 contacts with the insulated annulus 204 of the commutator 203.

Signal currents in the signal coil 190 tend to move the traveller 192 in one direction, while countersignal currents in the countersignal coil 191 tend to move the traveller in the opposite direction, and as before the traveller moves through a distance which is proportional to the difference in duration of the signal and countersignal currents. In the central position the brush 200 is in contact with the insulating annulus 204 as shown in Figure 15. If the traveller moves say, to the right, current is supplied to the electric motor associated with it through the contact ring 201 of the commutator 203 to move the rudder or elevator as the case may be through a distance proportional to the movement of the traveller and also in a direction corresponding to its movement. The rotation of the armature spindle of the motor in making this movement of the rudder or elevator is transmitted through the splines 223 to the spindle 206 which causes the commutator 203 to follow-up the movement of the carbon brush 200 and cut off the current to the motor in a similar manner to that hereinbefore described with reference to Figure 4. The counterweight 214 balances the weight of the traveller 192 when the controller is in different positions due to maneuvering the torpedo.

The operation of the controller otherwise is similar to the operation of the controllers 78R and 78E before described.

In Figure 2 the cranks 26 and 27 for operating the rudder and elevator brushes 20 and 21 are connected by links, Bowden cables or the like to an operating lever which is mounted so as to be capable of a rotational movement about its own axis and also of a rocking movement about an axis at right angles to its rotational axis. This lever is conveniently mounted on the aeroplane controlling the flight of the torpedo and is operated by the member of the crew of the aeroplane who directs or lays the torpedo. The rotational movement of the operating lever is used for controlling the position of the brush 20 for rudder control, while the rocking movement of the operating lever is used for controlling the position of the elevator brush 21 on the commutator 1.

It was found that if one of the control brushes 20 or 21 were suddenly moved to vary the ratio of signal to countersignal or inversely, the movable member of the controller was somewhat sluggish in responding to the movement of the operated brush, and that the rapidity of response could be substantially improved by increasing the signal to countersignal ratio for the first few cycles when a change in the position of the brush 20 or 21 is being effected, and in Figures 18 to 20 I have shown an arrangement for obtaining this result.

The rotational movement of the operating lever is transmitted through a Bowden cable, links or the like to an escapement-operating lever 290 of an intermediate mechanism. This mechanism is connected in the manner hereinafter described, to the rudder control brush 291 of the signal assembly commutator 292. The escapement-operating lever 290 is rotatably mounted on the spindle 293 of an electro-magnetic escapement 294. The escapement spindle 293 carries a crank arm 295 in which a pivot pin 296 is fixed. The inner end of the pin 296 is disposed between the free lower ends of two spaced cantilever laminated springs 297 which are fixed at their upper ends to a lug 298 of the escapement-operating lever 290, and which extend downwards one on each side of the centre line of this lever. A multiplying lever 299 is rotatably mounted on the pivot pin 296 on the crank arm 295, and the upper end of this lever is formed with a slot 300. With this slot 300 engages the outer end of a pin 301 which at its other end is fixed to the escapement-operating lever 290. The intermediate part of the pin 301 is located between the laminated springs 297 above described. The multiplying lever 299 has an arcuate slot 302 struck with the centre of the pivot pin 296 as radius, and through this slot the escapement spindle 293 passes.

The lower end of the multiplying lever 299 carries a pin 303 which engages with a longitudinally-extending slot 304 in a single-armed lever 305 which is rotatably mounted on the escapement spindle 293 and is located thereon between the escapement-operating lever 290 and the multiplying lever 299. The free end of the single-armed lever 305 is connected by means of a link 306 to a lever 307 pivotally mounted on the pin 308 and carrying the rudder control brush 291, i. e., the brush which selects the rudder signals and countersignals on the assembly commutator 292.

On the end of the escapement spindle 293 opposite to that carrying the crank 295, an armature disc 309 is rigidly fixed and coacts with an electromagnet 310 mounted on the bearing block 311 in which the escapement spindle 293 is rotatably mounted. The lower end of the escapement-operating lever 290 is connected by means of a link 312 to a control brush 313 which coacts with a commutator 314, termed the escapement commutator, for intermittently supplying current to the electro-magnet 310 of the escapement.

The escapement control brush 313 is mounted on a lever 313a carried on a pin 315, so that the brush can be swung in both directions from its central position in which it is in contact with the centre section of the commutator. The escapement commutator 314 is of waisted or dice-box shape and is rigidly mounted on the shaft 315 which carries the signal assembly commutator 292 for rudder and elevator control.

The periphery of the escapement commutator 314 is formed of conducting material with the exception of two gaps 316 formed thereon and filled with insulating material. The gaps extend inwards from opposite ends of the commutator and are in staggered relation to each other. The gaps 316 do not overlap so that in any position of the escapement brush 313 other than the central position an intermittent current is passed through the electro-magnet 310 as hereinafter described.

The signal assembly commutator 292 in this case is also of waisted or dice-box shape with two diametrically-opposite metal contact segments 317 and 318. The segments 317 and 318 are of the same form as shown in Figure 18 over the central part of the commutator, but over the outer or end parts of the commutator they subtend a constant angle at the centre, i. e., the segment 317 subtends at the centre an angle of 60 degrees over its right-hand end and an angle of 20 degrees at its left-hand end. Consequently the brush 291 in its swing over the commutator transmits a signal of variable duration over the centre part of its movement from contact with the segment 317, and a long signal of constant duration when moving over the right-hand end of the commutator and a short signal of constant duration when moving over the left-hand end of the commutator.

The parts of the periphery of the signal assembly commutator 292 separating the contact segments 317 and 318 are of insulating material.

An intermediate mechanism similar to that above described is used for transmitting rocking movements of the operating lever to the elevator control brush on the signal assembly commutator 292. This lever is connected to the escapement-operating lever, and the single-armed lever on this intermediate mechanism is connected to the elevator control brush (not shown) of the signal assembly commutator 292 in a similar manner to that above described for rudder control.

The rudder and elevator control brushes are spaced apart circumferentially on the signal assembly commutator 292 and are connected together with a synchronizing brush in circuits with a battery and the modulation valves of the transmitting set in a similar manner to that illustrated and described with reference to Figure 2. The escapement commutator 316 may also be connected in circuit with the brush 313 and electro-magnet 310 and the above battery or with a separate battery.

The signal assembly and escapement commutators 292 and 316 are rotated at a constant speed of say 1200 R. P. M. so that the electro-magnet 310 of the electric escapement 294 is energized and de-energized 20 times per second.

When the operating lever is rotated about its axis to effect rudder control, the escapement-operating lever 290 in the associated intermediate mechanism is correspondingly rocked on the escapement spindle 293. The escapement electro-magnet 310 is being continuously energized and de-energized at the rate mentioned above. When the electro-magnet 310 is energized, the escapement spindle 293 is held stationary, and with it the pivot pin 296 on the crank arm 295 carried thereon. When the escapement-operating lever 290 is swung with the pivot pin 296 held stationary, the leverage of the multiplying lever 299 with respect to the single-armed lever 305 is such that the latter lever moves through a greater angle than the angle through which the operating lever is rocked., i. e., if the operating lever moves through an angle of 2½ degrees, the single-armed lever 305 moves through 10 degrees in the particular example under consideration. Now, any motion of the escapement-operating lever 290 occurring while the escapement spindle 293 is held stationary causes one or other of the cantilever laminated springs 297 to press against the pivot pin 296 carried on the crank arm 295 mounted on one end of the escapement spindle 293 in such a manner as to try and make the crank arm 295 follow-up the motion of the escapement-operating lever. The crank arm 295 is free to effect this follow-up motion of the escapement-operating lever 296 during the intervals when the escapement electro-magnet 310 is de-energized. Consequently, since the pivot pin 296 on the crank arm 295 forms the fulcrum of the multiplying lever 299 operating the single-armed lever 305, it is evident that the angular displacement of the single-armed lever 305 for any motion of the escapement-operating lever 290 will firstly be a great magnification of that motion and then a falling back to an equality with that motion. For the particular example described, a 2½ degrees movement of the escapement-operating lever 290 first causes a 10 degrees displacement of the single-armed lever 305 followed by a falling back to 6 degrees on the first interruption of the escapement electro-magnet circuit and to a 2½ degrees on the second interruption of this circuit.

The result is that the rudder control brush 291, for example, on the signal assembly commutator 292 after an initially greater displacement than that corresponding to the required displacement is returned to a position corresponding to the required displacement and remains in the latter position until moved again by another movement of the operating lever and the escapement-operating lever 290. The effect on the transmission of control to the torpedo is to send signals and countersignals having a greater differentiation than that corresponding to the movement of the operating lever, for the first few revolutions of the signal assembly commutator 292 occurring after a movement of the operating lever. This supplies an initial boost to the movement of the rudder controller in the torpedo so that it responds more rapidly to the control signals and reaches the desired position in a shorter time.

Should the escapement-operating lever 290 be moved slowly the motion of the single-armed lever 305 is still a magnification of the displacement of the escapement-operating lever 290 so that a boost is still supplied to the rudder controller but of less intensity. So far as can be predicted by calculation the mechanism will cause a controller in the torpedo to follow very closely any movement of the operating lever in the aeroplane.

A rapid movement of the operating lever is followed by a rapid response, and a slow steady movement of this lever is followed by a slow steady response with practically no lag of the operative controller.

The elevator intermediate mechanism functions in a similar manner to that above described with reference to the rudder mechanism.

The signal assembly commutators and escapement commutators may be of cylindrical shape instead of waisted or dice-box shape as above described, and the control brushes instead of being swung on a pivot may be moved in a straight line.

My invention is not limited to radio transmission between the signal assembly commutator and the distributor. In the case of hydro-torpedoes or crewless vehicles for example, connection between these parts may be effected by a wire paid out by the vehicle or vessel as it moves along and carrying pulses of potential or current. If the controlling station is a moving vehicle or ship the wire may be paid out from both ends simultaneously.

Either modulated waves or interrupted continuous waves may be used in the transmission of the signals.

Modifications may be made in the arrangement of my invention for example, for small powers the signals and countersignals after being stepped up by the torsion make and break device may be passed directly through the armature of a motor which is only used to make fractions of a revolution, or to solenoid coils used to operate a plunger. Other modifications in detail and arrangement may be made in the invention above described.

I claim:

1. A remote control system comprising a control station and a controlled station, means at the control station for transmitting sets of three spaced impulses of the same character over a single channel to the controlled station, the spacing between the impulses being predetermined, the length of the period of one of the impulses of each set being constant and the individual lengths of the remaining impulses of the set being of equal period or selectively of any operative variation in period, a distributor at the controlled station associated with said channel to receive and distribute the impulses received over the channel, said distributor having means responsive to the constant length impulses for starting the operation of the distributor, the distributor then operating in timed relation with the spacing of the impulses to distribute the variable length impulses into separate channels, and differentially operative means operative over the said separate channels and responsive in relatively different degrees dependent upon the relative length of said variable impulses.

2. A remote control system comprising a control station and a controlled station, means at the control station for transmitting sets of impulses, each set of impulses having the same number of spaced electrical impulses of the same character over a single channel to the controlled station, the spacing between the impulses being predetermined, the length of the period of one of the impulses of each set being constant and the length of period of the remaining impulses of the set being of equal period or selectively of any operative variation in period, a distributor at the controlled station associated with said channel to receive and distribute electrical impulses received over the channel, said distributor having means responsive to the constant length electrical impulses for starting the operation of the distributor, the distributor then operating in timed relation with the spacing of the impulses to distribute the variable length impulses into separate channels, and differentially operative electrical means operative over the said separate channels and responsive to different degrees dependent upon the relative length of said variable length impulses.

3. A remote control system comprising a control station and a controlled station, means at the control station for transmitting sets of impulses having equal numbers of spaced impulses of radio-frequency and of the same character to the controlled station, the spacing between the impulses being predetermined, the length of the period of one of the impulses in each set being constant and the length of period of the remaining impulses of the set being of equal period or selectively of any operative variation in period, a receiving set for said impulses at the controlled station, means for relaying received impulses, a distributor associated with said relaying means to receive and distribute the relayed impulses, said distributor having means responsive to the constant length impulses for starting the operation of the distributor, the distributor then operating in timed relation with the spacing of the impulses to distribute the variable impulses over separate channels, and differentially operative electrical means operative over the said separate channels and responsive to different degrees dependent upon the relative length of said variable length impulses.

4. A remote control system comprising a control station and a controlled station, a radio-frequency transmitting set at the control station, means for transmitting to the controlled station impulse sets having the same number of impulses of radio frequency and of the same character, the spacing between the impulses being predetermined, the length of the period of one of the impulses of each set being constant and the length of the remainder of the impulses of the set being of equal period or selectively of any operative variation in period, a receiving set for said impulses at the controlled station, means for relaying the received impulses, a rotary distributor associated with said relaying means to receive and distribute said relayed impulses, an electric motor operatively connected to said distributor, a magnetically operated detent for retaining said motor in the starting position, said motor and detent being responsive to said constant length impulses for releasing said detent and starting said motor and distributor, the distributor then being driven by said motor in timed relation to the spacing of the impulses to distribute the variable length impulses into separate channels, and differentially operative electrical means operative over the said separate channels and responsive to different degrees dependent upon the relative length of said variable length impulses.

5. A remote control system comprising a control station and a controlled station, a radio frequency transmitting set at the control station, means for transmitting to the controlled station impulse sets having the same number of impulses of radio frequency and of the same character, the spacing between the impulses being predetermined, the length of the period of one of the impulses of each set being constant and the length of the remainder of the impulses of the set being of equal period or selectively of any operative variation in period, a receiving set for said impulses at the controlled station, means for the received impulses, a rotary distributor associated with said relaying means to receive and distribute said relayed impulses, and electric motor operatively connected to said distributor, a magnetically operated detent for retaining said motor in the starting position, said motor and detent being responsive to said constant length impulses for releasing said detent and starting said motor and distributor, means for automatically accelerating said motor after release of said detent, the distributor then operating in timed relation to the spacing of the impulses to distribute the variable length impulses into separate channels, and differentially operative electrical means operative over the separate channels and responsive to different degrees dependent upon the relative length of said variable length impulses.

6. A remote control system comprising a control station and a controlled station, a radio frequency transmitting set at the control station, means for transmitting to the controlled station impulse sets having the same number of impulses of radio frequency and of the same character, the spacing between the impulses being predetermined, the length of the period of one of the impulses of each set being constant and the length of the remainder of the impulses of the set being of equal period or selectively of any operative variation in period, a receiving set for said impulses at the controlled station, means for relaying the received impulses, a rotary distributor associated with said relaying means to receive and distribute said relayed impulses, an electric motor operatively connected to said distributor, a magnetically operated detent for retaining said motor in the starting position, means for automatically accelerating said motor after release of said detent, the distributor then operating in timed relation to the spacing of the impulses to distribute the variable length impulses into separate channels, and differentially operative rotary electrical means operative over the separate channels and responsive to different degrees dependent upon the relative length of said variable length impulses.

7. A remote control system comprising a control station and a controlled station, a radio frequency transmitting set at the control station, means for transmitting to the controlled station impulse sets having the same number of impulses of radio frequency and of the same character, the spacing between the impulses being predetermined, the length of the period of one of the impulses of each set being constant and the length of the remainder of the impulses of the set being of equal period or selectively of any operative variation in period, a receiving set for said impulses at the controlled station, means for relaying the received impulses, a rotary distributor associated with said relaying means to receive and distribute said relayed impulses, an electric motor operatively connected to said distributor, a magnetically operated detent for retaining said motor in the starting position, means for automatically and mechanically accelerating said motor after release of said detent, the distributor then operating in timed relation to the spacing of the impulses to distribute the variable length impulses into separate channels, and differentially operative reciprocatory electrical means operative over the separate channels and responsive to different degrees dependent upon the relative length of said variable length impulses.

BERNARD THOMSON.